United States Patent [19]

Kishimoto et al.

[11] Patent Number: 4,792,663
[45] Date of Patent: Dec. 20, 1988

[54] FLEXIBLE THERMOSENSITIVE WIRE HAVING A BARRIER LAYER FOR DRY-CLEANING SOLVENT AND A MOISTURE-PERMEABLE LAYER

[75] Inventors: Yoshio Kishimoto, Hirakata; Tomiharu Hosaka, Yahata, both of Japan

[73] Assignee: Matsushita Electric Industrial Co., Ltd., Osaka, Japan

[21] Appl. No.: 923,082

[22] Filed: Oct. 24, 1986

[30] Foreign Application Priority Data

Oct. 25, 1985 [JP] Japan .................................. 60-239859
Mar. 20, 1986 [JP] Japan .................................. 61-62254

[51] Int. Cl.⁴ ............................................. H05B 1/02
[52] U.S. Cl. .................................... 219/549; 174/107; 219/212; 219/505; 428/377; 428/379; 428/383
[58] Field of Search ................... 428/377, 379, 383; 219/212, 504, 505, 528; 174/549, 107

[56] References Cited

U.S. PATENT DOCUMENTS 2,846,560  8/1958  Jacoby et al. ............... 219/505 X
2,941,176  6/1960  Jacoby et al. ............... 219/542 X
4,575,620  3/1986  Ishii et al. ..................... 219/505 X Primary Examiner—Lorraine T. Kendell
Attorney, Agent, or Firm—Lowe, Price, LeBlanc, Becker & Shur

[57] ABSTRACT

A flexible thermosensitive wire which comprises a core strand, a pair of electrodes one of which is spirally wound around the core strand, a thermosensitive polymer layer formed between the paired electrodes, a barrier layer for a dry-cleaning solvent formed around the thermosensitive polymer layer having the other electrode spirally wound therearound, and an outermost moisture-permeable layer. The wire is adapted for use in electric warming devices in which because of the quick moisture release of the wire, a normal thermosensitive characteristic is quickly shown in practical applications. The electric warming devices can be dry cleaned without deterioration of the wire.

24 Claims, 1 Drawing Sheet

FLEXIBLE THERMOSENSITIVE WIRE HAVING A BARRIER LAYER FOR DRY-CLEANING SOLVENT AND A MOISTURE-PERMEABLE LAYER

BACKGROUND OF THE INVENTION

1. Field of the Invention

This invention relates to flexible thermosensitive wires which are adapted for use in electrically heated warming devices such as electric blankets, electric sheets or bedcovers and the like.

2. Description of the Prior Art

Since electric blankets and the like electric personal warming devices are used in direct contact with the skin, there has been a high demand for laundering. To meet the demand, washable electric blankets has been developed, which make use of flexible thermosensitive wires using thermosensitive polymer materials such as polyamide compositions of low moisture absorption.

In order for one to subject an electric blanket to dry cleaning, the heater wire has to be resistant to solvent. U.S. Pat. No. 2,941,176 proposed a heater wire which had an insulative jacket made of a high molecular weight monomeric ester plasticizer, i.e., pentaerythritol ester. However, this wire has not been found satisfactory with respect to the solvent resistance. Japanese Laid-open patent application No. 60-89901 has proposed a flexible thermosensitive wire whereby a solvent resistant is imparted. In this flexible thermosensitive wire, a thermosensitive polymer layer is covered with a barrier layer for solvent made, for example, of ethylene-vinyl alcohol copolymers or highly crystalline polyolefins or a layer of a non-dissolving polymer material such as an ethylene-vinyl chloride copolymer or a polymer alloy of the copolymer with polyvinyl chloride.

Thermosensitive polymer materials of a low moisture absorption are used in these flexible thermosensitive wires, but the polymeric barrier materials or non-dissolving polymer materials are also used to cover the thermosensitive polymer material. Accordingly, release of moisture from the thermosensitive polymer material or a material inside the thermosensitive polymer material is prevented. This involves the problem that the recovery of the thermosensitive characteristic becomes very slow. When such a wire is applied as an electric blanket, the temperature of the blanket cannot be precisely controlled during use within a short period of time.

SUMMARY OF THE INVENTION

It is an object of the invention to provide a flexible thermosensitive wire which is adapted for use in electrically heated warming devices such as an electric blanket.

It is another object of the invention to provide a flexible thermosensitive wire in which while a thermosensitive polymer material is best utilized, the wire has a high dry-cleaning resistance when applied to electrically heated warming devices.

The flexible thermosensitive wire according to the invention is of the type which comprises a core strand, a pair of electrodes in a spaced relation with each other, and a thermosensitive polymer layer formed between the paired electrodes and completely covering the core strand. The invention is characterized in that a barrier layer for a dry-cleaning solvent, which is capable of moisture permeation, is formed to cover the thermosensitive polymer layer and one of the paired electrode formed on the thermosensitive polymer layer, and an outermost moisture-permeable layer of a soft polymer material which has a better vapor permeability than the barrier layer and is resistant to a dry-cleaning solvent is formed to cover the barrier layer whereby the wire has a high dry-cleaning resistance. Preferably, a separation layer is provided between the thermosensitive polymer having thereon one of the paired electrode and the barrier layer in order to prevent the thermosensitive polymer layer from deterioration in relation to time.

In accordance with a more specific embodiment of the invention, there is also provided a flexible thermosensitive wire of the type which comprises a core strand, a first electrode spirally or helically wound around said core strand, a thermosensitive polymer layer covering the cores strand and the first electrode, a second electrode spirally wound around the thermosensitive polymer layer, a barrier layer for a dry-cleaning solvent which is capable of moisture permeation and is formed to cover the thermosensitive polymer layer and the second electrode, and an outermost moisture-permeable layer of a soft polymer material which has a better moisture permeability than the barrier layer and is resistant to a dry-cleaning solvent whereby the wire has a high dry-cleaning resistance. In this case, the separation layer as mentioned above is preferably formed in a similar manner. The electrodes used in the above embodiments may usually take a ribbon form.

The flexible thermosensitive wire of the invention has good thermal stability of the thermosensitive polymer layer in relation to time and, when applied to, for example, an electric blanket, can stably maintain the temperature of the blanket, which is thus comfortable during use. When such a blanket becomes dirty, it can be dry-cleaned. This is very advantageous from the practical point of view. More particularly, the wire according to the invention can quickly release moisture. Even when it takes up moisture, the thermosensitive characteristic returns to an original level within a short time. In addition, the wire has a high dry cleaning resistance and only a very small degree in variation of the thermosensitive characteristic is experienced. The wire which is clean dried has hold its flexibility.

When the separation layer is further formed, the thermosensitive wire has a very excellent thermal stability with time with respect to the thermosensitive characteristic. Moreover, the wire may be readily worked at a terminal thereof for use as a lead wire by elimination of the outer layers because of the presence of the separation layer. This gives a great merit in terminal mold processings.

BRIEF DESCRIPTION OF THE DRAWINGS

FIG. 4 is a graphical representation of an impedance in relation to variation in temperature prior to and after immersion in a solvent of flexible thermosensitive wires of the invention and for comparison.

DETAILED DESCRIPTION AND EMBODIMENTS OF THE INVENTION

Figure 1:
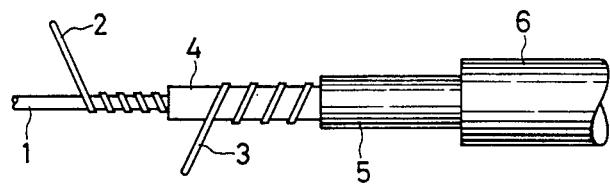
FIG. 1 is a schematic illustrative view of a flexible thermosensitive wire according to one embodiment of the invention.

Reference is now made to the accompanying drawings and particularly, to FIG. 1, which shows a flexible thermosensitive wire W according to the invention. The wire W comprises an insulative core strand 1 made, for example, of a polyester resin or other materials ordinarily used for these purposes. Around the core strand 1 is spirally or helically wound an electrode 2 which may take a ribbon form as shown. The electrode 2 is completely covered with a thermosensitive polymer layer 4, which is in turn helically wound with an electrode 3 as shown. The electrodes 2 and 3 are made, for example, of copper or copper alloys. The thermosensitive polymer layer 4 has a substantially uniform thickness of, for example, 0.1 to 0.5 mm along the length thereof and has thus a generally cylindrical cross-sectional configuration. This layer 4 is required to have a thermistor characteristic and/or a fusing function and is made, in most cases, of a polyamide composition in order to utilize the thermosensitive characteristic of hydrogen bonds of the amido groups. The polyamide composition should preferably be formulated to have thermistor characteristics as desired. Such a composition comprises, for example, 50 to 90 wt% of a polyamide resin and 50 to 10 wt% of a thermoplastic phenolic resin. However, these electrodes 2,3 and the thermosensitive polymer layer 4 are not critical with respect to the type of material or composition and one may employ any known materials for these electrodes 2,3 and the layer 4 in the practice of the invention. For instance, the thermosensitive polymer layer may be formed of a polymer composition whose electric resistance, electrostatic capacity or impedance is of the negative or positive temperature dependence or may be formed of a crystalline polymer composition having a temperature-fusing function.

The present invention is characterized in that the electrode 3 and the thermosensitive polymer layer 4 are covered with a barrier layer 5 against a dry-cleaning solvent, which layer 5 has thus a good dry-cleaning resistance, and a moisture-permeable outermost layer 6, both formed such as by extrusion or other techniques.

The polymer materials used as the barrier layer 5 for a dry-cleaning solvent include, for example, ethylene-vinyl alcohol copolymers, highly crystalline polyolefins, polyvinylidene halides, fluorine-containing polymers, polyamides, metal chelate-containing polymers, acrylonitrile copolymers and the like. These materials have all high crystallinity and exhibit a good barrier property. However, the highly crystalline polymer materials have a greater modulus of elasticity then ordinary soft polymer materials. When the barrier layer 5 is provided as an outermost layer of the flexible thermosensitive wire, the flexibility of the wire lowers, making it rather unfit for practical applications. Accordingly, the barrier layer 5 is applied over the thermosensitive polymer layer 4 and the electrode 3, over which the moisture-permeable outermost layer is applied.

Among the polymer materials indicated above, those polymers which have hydrophilic groups, such as a hydroxyl group, an amido group and/or a carboxyl group, have high affinity for water molecules and have a great moisture permeability. Such polymers have thus both a good barrier property and a good moisture permeability. Accordingly, hydrophilic group-containing polymer materials such as ethylene-vinyl alcohol copolymers, polyamides and the like are preferred. Of ethylene-vinyl alcohol copolymers, random or alternating copolymers are most preferred because of the better moisture permeability. On the other hand, a number of polyamides are known including nylon homopolymers such as nylon 6, nylon 11, nylon 12 and the like, and copolymers such as polyether-amides, polyester-amides, N-substituted polyamides and the like. Of these, nylon homopolymers have generally high crystallinity and, thus, exhibit a good barrier property. However, when the content of the amido groups such as in nylon 6 increases, the modulus of elasticity undesirably increases, resulting in a lowering of flexibility of the resultant flexible thermosensitive wire. In view of the above, most preferable polyamides are nylon 11 and nylon 12.

The barrier layer 5 has generally a thickness of from 0.05 to 0.2 mm in order to ensure the barrier property and allow a suitable degree of moisture permeability.

The outermost moisture-permeable layer 6 covering the barrier layer 5 should be made of soft polymer materials or compositions which exhibit a moisture permeability equal to or better than the polymer materials of the barrier layer 5 and a good solvent resistance. A great number of soft polymer materials or compositions are known, of which polyvinyl chloride compositions are preferred. Because of the presence of vinyl chloride units, it is easy to impart a flame resistance to the composition, e.g. when ordinary flame retardants such as antimony oxide are added to a polyvinyl composition, a flame resistance expressed by a lowest oxygen index not less than 25 is readily imparted. Accordingly, such a polyvinyl chloride composition is suitable for use as a material for the outermost layer or jacket of this type of flexible thermosensitive wire.

Polyvinyl chloride is easily softened by addition of other polymers or platicizers. Other polymers for blending with the polyvinyl chloride should preferably have a great moisture permeability and are, for example, those polymers which have urethane groups or ester groups having relatively good affinity for water molecules. Examples of such polymers include polyurethanes and vinyl chloride copolymers such as vinyl chloride-urethane copolymers, vinyl chloride-acrylic copolymers, vinyl chloride-vinyl acetate copolymers and the like. Of these, polyurethanes and vinyl chloride-urethane copolymers are preferably since they are very soft and have very high moisture permeability with good resistances to solvent and cold temperature. Compositions which comprise blends of polyvinyl chloride and polyurethanes or vinyl chloride-urethane copolymers have a high moisture permeability and a good solvent resistance with good cold temperature and flame resistances. The term 'solvent resistance' used herein means little or no solubility in dry-cleaning solvents. Only one drawback involved in polyurethanes or vinyl chloride copolymers is a low heat resistance.

In general, the heat resistance of a plasticized polyvinyl chloride composition greatly varies depending on the type of plasticizer. Heat-resistant plasticizers include polyesters, trimellitates, pentaerythritol esters, epoxy compounds and the like. Since polyester plasticizers have ester groups, they have high affinity for water molecules. In addition, ester compounds are readily polymerized, so that when the compounds are polymerized to have an average molecular weight not less than 6000, the resultant polyesters exhibit a good solvent resistance. Although the polyester plasticizers may be classified into phthalate plasticizers, adipate plasticizers and sebacate plasticizers, the sebacate plasticizers are preferred. This is because sebacic acid is a long-chain dibasic acid with a long distance between the polar groups of the ester bonds and a great degree of freedom of the molecules, so that this type of plasticizer is most compatible with polyvinyl chloride. If polyvinyl chloride and a polyester plasticizer having an average molecular weight not less than 6000 are mixed, the resulting composition exhibit a high vapor permeability and a good solvent resistant with good heat and flame resistances. However, the plasticizer is so high in molecular weight that the composition has not always a satisfactory cold resistance.

A preferable polyvinyl chloride composition according to the invention comprises 100 parts by weight of polyvinyl chloride, 30 to 100 parts by weight of a polyester plasticizer having an average molecular weight not less than 6000, and 20 to 80 parts by weight of a polyurethane or a vinyl chloride copolymer. The vinyl chloride copolymer includes, for example, a vinyl chloride-urethane copolymer, a vinyl chloride-acrylic copolymer, a vinyl chloride-vinyl acetate copolymer and mixtures thereof. This composition has a high moisture permeability, an excellent solvent resistance and good heat, cold and flame resistances and are thus suitable for use as the flexible, moisture-permeable outermost layer. If the polyester plasticizer is less than 30 parts by weight, the moisture permeability and heat resistance become worse. Over 100 parts by weight, the compatibility becomes poor, causing a bleedout phenomenon. On the other hand, when the polyurethane or vinyl chloride copolymer is less than 20 parts by weight, the moisture permeability and flexibility deteriorate. Over 80 parts, the heat resistance becomes poor.

In order to further improve the mechanical strength and heat resistance of the composition, it is preferred that the polyvinyl chloride used should have an average degree of polymerization of not less than 1800. Since the flexible thermosensitive wire of the invention is adapted for use in electric blankets or sheets where cloths or woven fabrics are heated during use, it is desirable that the mechanical strength be high with high heat and flame resistances. These characteristic properties can all be imparted to the wire when using the above composition.

As is known in the art, polyvinyl chloride grains consisting of granules or particles are each covered with a thin skin on the surface thereof. These grains do not separate into particles even when a plasticizer is added to the polyvinyl chloride, tending to cause fisheyes. To avoid this, skinless grains of polyvinyl chloride are conveniently used. The skinless grains have been prepared according to a specific known manner of polymerization. These grains have improved compatibility with plasticizers and good dispersability. Thus, the skinless grains are preferred for use in the polyvinyl chloride composition of the invention.

The outermost layer has generally a thickness of 0.2 to 0.6 mm in order to fully show its characteristic properties.

The flexible thermosensitive wire according to the invention may be used, for example, as a temperature sensor when the built-in electrodes are used as signal wires, or as a thermosensitive heater when at least one electrode is used also as a heating conductor.

In general, dry cleaning takes about 30 minutes in one process, in which tetrachloroethylene or petroleum solvents are used as a cleaning solvent. The flexible thermosensitive wire of the invention can stand use upon exposure to the solvent within the above time, within which the thermosensitive characteristic does rarely vary while keeping the flexibility of the wire without dissolution of a plasticizer in the solvent.

Figure 2:
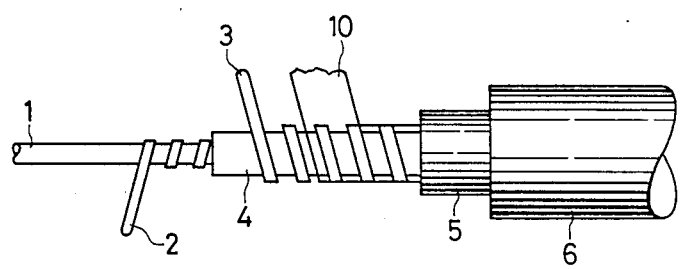
FIG. 2 is a schematic illustrative view, similar to FIG. 1, of another embodiment of the invention.
Figure 3:
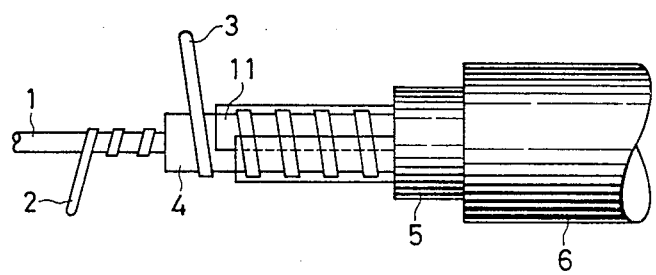
FIG. 3 is a schematic illustrative view of a further embodiment of the invention.

In the above embodiment, the thermosensitive polymer layer 4 is brought into intimate contact with the barrier layer 5, whereupon gradual migration of the resins may take place. This will cause the thermosensitive characteristic of the layer 4 to vary with time. If the barrier layer 5 is formed of a polyamide composition and the thermosensitive polymer layer is also made of a polyamide composition, the migration is more liable to occur. To avoid this, a separation layer is formed, as 10 in FIG. 2 or 11 in FIG. 3, between the thermosensitive polymer layer 4 and the barrier layer 5. In FIG. 2, the the separation layer 10 is spirally wound over the thermosensitive polymer layer 4 without leaving a space between any adjacent spiral turns for complete coverage. The separation layer 11 of FIG. 3 is to wrap the layer 4 as shown. The separation layer 10 or 11 is made, for example, of a polyester or polyolefin film. By the provision of the separation layer 10 or 11, the migration phenomenon can be fully prevented, by which the thermosensitive characteristic of the layer 4 is reliably kept.

The present invention is more particularly described by way of examples.

EXAMPLE 1

In this example, a flexible thermosensitive wire of the type as shown in FIG. 1 was fabricated. The wire had a polyester core 1, a pair of ribbon electrodes 2,2 of a copper alloy, a 0.15 mm thick thermosensitive polymer layer 4 of a low moisture absorption composed of a polyamide composition comprising a phenolic resin material, a nylon 12 layer as a barrier for a solvent, and an outermost moisture-permeable layer 6. The outermost layer 6 was made of a composition comprised of 100 parts by weight of polyvinyl chloride, 30 parts by weight of polyurethane, 50 parts by weight of a polyester plasticizer having an average molecular weight of 8000 (Polycizer P-202, produced by Dainippon Ink Chem. Co., Ltd.), 3 parts by weight of a Ba-Zn thermal stabilizer, and 15 parts by weight of a mixture of antimony oxide and calcium carbonate. The layer 6 had a thickness of 0.4 mm, which was larger than that of the layer 5.

This flexible thermosensitive wire was subjected to a moisture-releasing test. In the test, the wire was dried at 80° C. for 120 hours and subjected to measurement of an impedance ($Z_{D80}$). Thereafter, the wire was subjected to moisture absorption to a saturation under conditions of a temperature of 43° C. and a relative humidity of 78% and allowed to stand at a temperature of 80° C. for 1 hour, followed by measurement of an impedance ($Z_{W80}$). The moisture release was evaluated as a variation in the impedance of $\Delta Z_W = Z_{W80}/Z_{D80}$. The results are shown in Table 1.

EXAMPLES 2-5

The general procedure of Example 1 was repeated using different materials or compositions for the barrier layer 5 and the outermost layer 6. The results of the moisture release test are also shown in Table 1, in which Paraplex G-25 used as the plasticizer is a polyester plasticizer having an average molecular weight of 8000, produced by Rohm and Haas Inc.

For comparison, the general procedure of Example 1 was repeated using high density polyethylene for the barrier layer 5 and an ethylene-vinyl chloride copolymer or a mixture of polyvinyl chloride and polyurethane for the outermost layer 6.

TABLE 1

| | Solvent Barrier Layer | Composition for Outermost Layer | | | $\Delta Z_W$ |
|---|---|---|---|---|---|
| | | Polyvinyl Chloride Parts by Wt. | Plasticizer Parts by Wt. | Polymer to be Blended Parts by Wt. | |
| Example: | | | | | |
| 1 | nylon 12 | PVC (100) | Polycizer P-202 (50) | Polyurethane (30) | 0.88 |
| 2 | nylon 12 | PVC (100) | Polycizer P-202 (40) | vinyl chloride-urethane copolymer (70) | 0.90 |
| 3 | nylon 12 | skinless PVC (100) | Paraplex G-25 (40) | Polyurethane (40) | 0.90 |
| 4 | nylon 11 | PVC (100) | Paraplex G-25 (40) | Polyurethane (40) | 0.86 |
| 5 | nylon 11 | skinless PVC (100) | Polycizer P-202 (80) | vinyl chloride-urethane copolymer (50) | 0.92 |
| Comparative Example: | | | | | |
| 1 | high density polyethylene | — | — | ethylene-vinyl chloride copolymer (100) | 0.64 |
| 2 | high density polyethylene | PVC (100) | — | polyurethane (30) | 0.66 |

As will be apparent from the above table, the flexible thermosensitive wires according to the invention can release moisture from the inside thereof very quickly. This is advantageous in that when the wires are used in electric blankets, the temperature of the blanket returns to a normal state within a very short time and thus, the blanket is invariably comfortable in use.

EXAMPLE 6

The wire of Example 1 was subjected to an immersion test using a dry-cleaning solvent. In the test, the wire was immersed in tetrachloroethylene for 30 minutes and dried at 60° C. for 30 minutes, this cycle being repeated three times in total. The impedance-temperature characteristic curve per unit meter of the wire is shown in FIG. 4. In the figure, the curves A and B are, respectively, obtained prior to and after the immersion test.

For comparison, the above test was repeated using a wire which had no barrier layer 5 of FIG. 1 and an outermost layer 6 of a polyvinyl chloride composition comprising polyvinyl chloride and a polyester plasticizer of a low molecular weight (Comparative Example 3). The curve for this wire after the immersion is indicated as curve C in FIG. 4.

The impedance values of the wire of the invention prior to and after the immersion are significantly higher than the comparative wire. In addition, the wires after the immersion test were each dried at 80° C. for 24 hours, revealing that the outer diameter of the comparative wire reduced by about 12% with the flexibility being substantially lost and that the wire of the invention underwent little change in diameter.

The above wires after the immersion test were each subjected to a temperature fuse performance test in which the ambient temperature was increased from 150° C. at a rate of 1° C./minute. As a result, it was found that the wire worked at 174° to 179° C., but the comparative wire fused at a high temperature of 183° to 195° C., which is unfavorably wider in a temperature range.

The wires of Examples 2 through 5 were also tested in the same manner as described above, with similar results.

EXAMPLE 7

In this example, a wire having such a construction as shown in FIG. 2 were fabricated. The wire had a polyester core 1, a pair of ribbon electrodes 2,3 of a copper alloy, a thermosensitive polymer layer 4 of a low moisture absorption made of a nylon 12 composition incorporated with a phenolic resin material, a polyester separation layer 10, a 0.15 mm thick nylon 12 layer 5 as a barrier for solvents, and a 0.4 mm thick outermost layer 6. The outermost layer 6 was made of a composition comprised of 100 parts by weight of polyvinyl chloride, 30 parts by weight of polyurethane, 50 part by weight of a polyester plasticizer having an average molecular weight of 8000 (Polycizer P-202, produced by Dainippon Ink Chem. Co., Ltd.), 3 parts by weight of a Ba-Zn thermal stabilizer, and 15 parts by weight of a mixture of antimony oxide and calcium carbonate. The flexible thermosensitive wire was subjected to a heat-resistant test. The test was effected in such a way that the wire was dried at 100° C. for 10 hours and subjected to measurement of impedance ($Z_o$). Thereafter, the wire was allowed to stand at 100° C. for 500 hours and then subjected again to measurement of impedance (Z). The variation of the impedance of $\Delta Z_H = Z/Z_o$ was used for the evaluation. The results are shown in Table 2.

EXAMPLES 8, 9

The general procedure of Example 7 was repeated except that the materials for the barrier layer 5 or the separation layer 10 were changed as indicated in Table 2 and the manner of winding of the separation layer was changed in Example 8. The results are also shown in Table 2.

For reference, the above procedure was repeated except for those indicated in Table 2.

TABLE 2

Variation in Impedance of Flexible Thermosensitive Wires after Heat Application at 100° C. for 500 Hours

| | Thermosensitive Polymer Layer | Barrier Layer | Separation Layer (manner of winding) | $(Z/Z_o)_{500\ hrs}$ |
|---|---|---|---|---|
| Example: | | | | |
| 7 | nylon 12 composition comprising a phenolic material | nylon 12 | polyester film (FIG. 2) | 1.03 |
| 8 | nylon 12 composition comprising a phenolic material | nylon 12 | polyester film (FIG. 3) | 1.04 |
| 9 | nylon 12 composition comprising a phenolic material | nylon 11 | polypropylene film (FIG. 2) | 1.12 |
| Reference: | | | | |
| 4 | nylon 12 composition comprising a phenolic material | nylon 11 | nil | 1.53 |
| 5 | nylon 12 composition comprising a phenolic material | nylon 12 | nil | 1.71 |

The above results reveal that the wires having the separation layer are improved over the separation layer-free wires. The separation layer is advantageous in that when the wire terminal is worked for electric connection, this can be done readily.

What is claimed is:

1. In a flexible thermosensitive wire which comprises a core strand, a pair of electrodes in a spaced relation to each other, and a thermosensitive polymer layer formed between the paired electrodes and covering the core strand, the improvement comprising; a solvent barrier layer, which is permeable to moisture formed to cover the thermosensitive polymer layer and one of the paired electrodes formed on the thermosensitive polymer layer, and an outermost moisture-permeable layer of a soft polymer material which has a better vapor permeability than the barrier layer and is resistant to a dry-cleaning solvent formed to cover the barrier layer; and a separation layer separating said barrier layer and said thermosensitive polymer layer and one of the paired electrodes wound around said thermosensitive polymer layer thereby preventing direct contact between said barrier layer and said thermosensitive polymer layer whereby the wire has a high dry-cleaning resistance.

2. A wire according to claim 1, wherein said barrier layer is made of a hydrophilic group-containing polymer.

3. A wire according to claim 2, wherein said hydrophilic group-containing polymer is a nylon homopolymer.

4. A wire according to claim 3, wherein said nylon homopolymer is nylon 11 or nylon 12.

5. A wire according to claim 1, wherein said outermost moisture-permeable layer is a polyvinyl chloride composition.

6. A wire according to claim 5, wherein said polyvinyl chloride composition comprises a mixture of 100 parts by weight of polyvinyl chloride, 30 to 100 parts by weight of a polyester plasticizer having an average molecular weight of not less than 6000, and 20 to 80 parts by weight of at least one member selected from vinyl chloride-urethane copolymer, vinyl chloride-acrylic copolymer, vinyl chloride-vinyl acetate copolymer and polyurethane.

7. A wire according to claim 6, wherein said polyester plasticizer is a sebacate plasticizer.

8. A wire according to claim 6, wherein said polyvinyl chloride composition further comprises a flame retardant so that it has a lowest oxygen index not less than 25.

9. A wire according to claim 6, wherein said polyvinyl chloride has an average degree of polymerization of not less than 1800.

10. A wire according to claim 6, wherein said polyvinyl chloride is in the form of skinless grains.

11. A wire according to claim 1, wherein said thermosensitive polymer layer is made of a polyamide composition, said barrier layer is made of another polyamide composition, and said separation layer is a polyester or polyolefin film.

12. A wire according to one of claims 1 or 11, wherein said separation layer is spirally wound over said thermosensitive polymer layer without leaving a space between any adjacent turns.

13. A wire according to one of claims 1 or 11, wherein said separation layer completely wraps said thermosensitive polymer layer.

14. A flexible thermosensitive wire comprising: a core strand, a first electrode spirally wound around said core stand, a layer of thermosensitive polyamide composition covering the cores strand and the first electrode, a second electrode spirally wound around the thermosensitive polymer layer, a solvent barrier layer which is permeable to moisture formed to cover the thermosensitive polyamide layer and the second electrode, and an outermost moisture-permeable layer of a soft polymer material which has a between vapor permeability than the barrier layer and is resistant to a dry-cleaning solvent formed to cover the barrier layer; and a separation layer separating said barrier layer and said thermosensitive polymer layer and said second electrode thereby preventing direct contact between said barrier layer and said thermosensitive polymer layer whereby the wire has a high dry-cleaning resistance.

15. A wire according to claim 14, wherein said barrier layer is a nylon homopolymer.

16. A wire according to claim 15, wherein said nylon homopolymer is nylon 11 or nylon 12.

17. A wire according to claim 14, wherein said outermost moisture-permeable layer is a polyvinyl chloride composition.

18. A wire according to claim 17, wherein said polyvinyl chloride composition comprises a mixture of 100 parts by weight of polyvinyl chloride, 30 to 100 parts by weight of a polyester plasticizer having an average molecular weight of not less than 6000, and 20 to 80 parts by weight of at least one member selected from vinyl chloride-urethane copolymer, vinyl chloride-acrylic copolymer, vinyl chloride-vinyl acetate copolymer and polyurethane.

19. A wire according to claim 18, wherein said polyvinyl chloride composition further comprises a flame retardant so that it has a lowest oxygen index not less than 25.

20. A wire according to claim 18, wherein said polyvinyl chloride has an average degree of polymerization of not less than 1800.

21. A wire according to claim 18, wherein said polyvinyl chloride is in the form of skinless grains.

22. A wire according to claim 15, wherein said thermosensitive polymer layer is made of a polyamide composition, said barrier layer is made of another polyamide composition, and said separation layer is a polyester or polyolefin film.

23. A wire according to one of claims 15 or 22, wherein said separation layer is spirally wound over said thermosensitive polymer layer without leaving a space between any adjacent spiral turns for complete coverage.

24. A wire according to one of claims 15 or 22, wherein said separation layer completely wraps said thermosensitive polymer layer.

* * * * *